United States Patent Office 3,294,782
Patented Dec. 27, 1966

---

3,294,782
3,4-DIHYDRO-6-PHENYL-1,5-BENZODIAZOCIN-2-ONES
Theodore S. Sulkowski, Haverford, Pa., assignor to American Home Products Corporation, New York, N.Y., a corporation of Delaware
No Drawing. Filed July 7, 1964, Ser. No. 380,926
2 Claims. (Cl. 260—239.3)

This invention is concerned with 3,4-dihydro-6-phenyl-1,5-benzodiazocin-2-ones having marked central nervous system activity, and in particular, central nervous system depressant activity.

The claimed compounds are represented by the following formula:

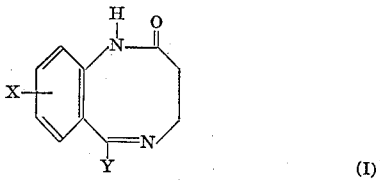

(I)

wherein X is hydrogen, halo(lower)alkyl, preferably dichloromethyl or trifluoromethyl; halogen, preferably chlorine or bromine; and Y is phenyl, or o-, m-, or p-halophenyl, preferably, o-chlorophenyl.

The compounds of the present invention are prepared by the process illustrated by the following equation:

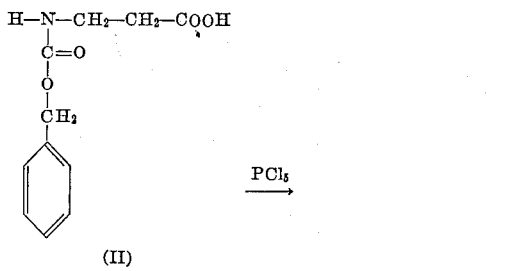

(II)

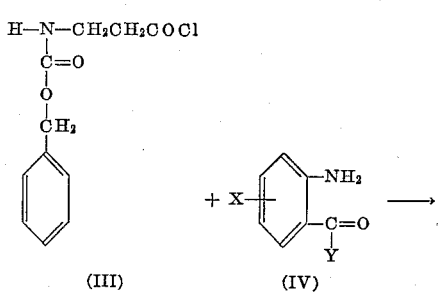

(III)          (IV)

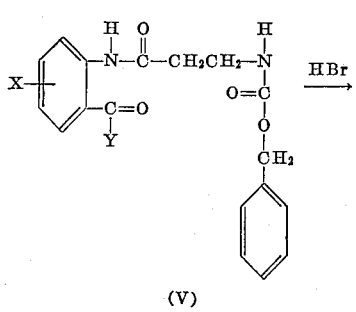

(V)

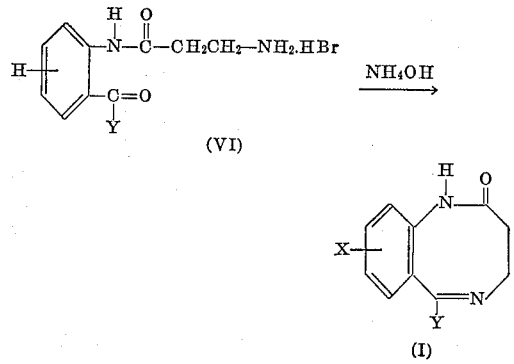

(VI)

(I)

In the above formulas, X and Y have the same meaning previously set forth.

In practising the outlined process, a known starting material, carbobenzyloxy-β-alanine (II) is treated conventionally in anhydrous ether with excess phosphorus pentachloride to form the corresponding acid chloride (III). The reaction mixture then is decanted from the excess phosphorus pentachloride and added to a chloroform solution of the other known starting material, which is a 2-aminobenzophenone (IV). The reaction mixture thus obtained is stirred for about an hour at room temperature. Next, the reaction mixture is extracted with water, dried and evaporated to dryness. The residue is a 2-(β-carbobenzyloxyalanylamido)-benzophenone (V). This compound then is treated at room temperature with 30% hydrogen bromide in acetic acid to split off a carbobenzyloxy group and thus produce the hydrobromide of a 2-(β-alanylamino)-benzophenone (VI). This product then is dissolved in water and made basic with ammonium hydroxide. This treatment results in an oil which is extracted with toluene. The extracts are refluxed for about 8 hours while continuously removing the water of reaction as it forms thereby inducing ring closure and formation of the desired 3,4-dihydro-6-phenyl-1,5-benzodiazocin-2-one (I). The product can be recrystallized from xylene.

The following examples further illustrate the invention:

EXAMPLE 1

Seventeen grams of phosphorus pentachloride is added to a stirred suspension of 14.6 g. of carbobenzyloxy-β-alanine and 250 ml. of anhydrous ether cooled in an ice-acetone bath. The mixture is stirred and cooled for 1.5 hours then decanted from the excess phosphorus pentachloride. This solution is added rapidly to a solution of 13 g. of 2-amino-5-chlorobenzophenone in 75 ml. of chloroform and stirred one hour. The solution is extracted with water, dried over magnesium sulfate, and evaporated to a solid residue. On recrystallization from alcohol there is obtained 2-(β-carbobenzyloxyalanylamido)-5-chlorobenzophenone, M.P. 115° C.

Eight grams of the above solid is treated with 20 ml. of 30% hydrogen bromide in acetic acid for one hour at room temperature. The mixture is triturated with ether and the solid separated by filtration. The crude hydrobromide is dissolved in 50 ml. of water and made basic with ammonium hydroxide. The precipitated oil is extracted with 100 ml. of toluene and the extract is refluxed for 8 hours in a flask equipped with a water separator. After cooling, the precipitated solid is separated, and on recrystallization from xylene there is obtained 8-chloro-3,4-dihydro-6-phenyl-1,5-benzodiazocin-2-one, M.P. 310° C. (dec.).

*Analysis.*—Calcd. for $C_{16}H_{13}ClN_2O$: C, 67.49; H, 4.60; N, 9.84. Found: C, 67.59; H, 4.58; N, 10.01.

By the same procedure, reaction of carbobenzyloxy-β-alanine with the following starting materials affords the corresponding intermediates and final products hereinafter disclosed:

| Starting Compounds | Intermediates and Final Products |
|---|---|
| 2-Amino-benzophenone | 2-(β-carbobenzyloxyalanylamido) benzophenone; 2-(β-alanylamido) benzophenone and 3,4-dihydro-6-phenyl-1,5-benzodiazocin-2-one. |
| 2-Amino-5-dichloromethyl-2'-chlorobenzophenone. | 2-(β-carbobenzyloxyalanylamido)-5-dichloromethyl-2'-chlorobenzophenone; 2-(β-alanylamido)-5-dichloromethyl-2'-chlorobenzophenone and 8-dichloromethyl-3,4-dihydro-6-(o-chlorophenyl)-1,5-benzodiazocin-2-one. |
| 2-Amino-5-trifluoromethyl-3'-bromobenzophenone. | 2-(β-carbobenzyloxyalanylamido)-5-trifluoromethyl-3'-bromobenzophenone; 2-(β-alanylamido-5-trifluoromethyl-3'-bromobenzophenone and 8-trifluoromethyl-3,4-dihydro-6-(m-bromophenyl)-1,5-benzodiazocin-2-one. |
| 2-Amino-5,4'-difluorobenzophenone. | 2-(β-carbobenzyloxyalanylamido)-5,4'-difluorobenzophenone; 2-(β-alanylamido)-5,4'-difluorobenzophenone and 8-fluoro-3,4-dihydro-6-(p-fluorophenyl)-1,5-benzodiazocin-2-one. |
| 2-Amino-5-bromobenzophenone | 2-(β-carbobenzyloxyalanylamido)-5-bromobenzophenone; 2-(β-alanylamido)-5-bromobenzophenone and 8-bromo-3,4-dihydro-6-phenyl-1,5-benzodiazocin-2-one. |

The effective dosage of the present compounds can vary over a wide range from about 50 to about 500 milligrams per day or more, administered in the form of tablets, pills, capsules or of injectable solutions with the proper solid or liquid carrier. As the present compounds can be placed conventionally in suitable dosage forms by pharmacists only one example is given of the various possible unit dosage forms.

EXAMPLE 2

*Tablet*

| | |
|---|---|
| 8 - chloro-3,4-dihydro-6-phenyl-1,5-benzodiazocin-2-one, mg. | 50 |
| Lactose, mg. | 26.2 |
| Starch U.S.P., mg. | 20.6 |
| Magnesium stearate | 0.5 |

In making the above tablet, the active ingredients are mixed with the lactose and part of the starch and granulated with a sufficient quantity of paste made from the remainder of the starch. The granulated material is dried at 40–50° C. and screened through 90 mesh. Next the magnesium stearate is screened into the granulation with which it is blended. Tablets are pressed therefrom with a suitable tabletting machine.

What is claimed is:

1. A compound of the formula:

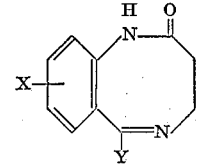

wherein X is selected from the group of hydrogen, halo (lower) alkyl, and halogen and Y is selected from the group of phenyl and halophenyl.

2. 8 - chloro-3,4-dihydro-6-phenyl-1,5-benzodiazocin-2-one.

No references cited.

WALTER A. MODANCE, *Primary Examiner.*

ROBERT T. BOND, *Assistant Examiner.*